April 23, 1929.  H. O. RUSSELL ET AL  1,710,115
AUTOMATIC BOMB SIGHT
Filed April 18, 1922   2 Sheets-Sheet 1

INVENTORS
Herbert O. Russell
Charles Leigh Paulus
By Robert H. Young ATTORNEY

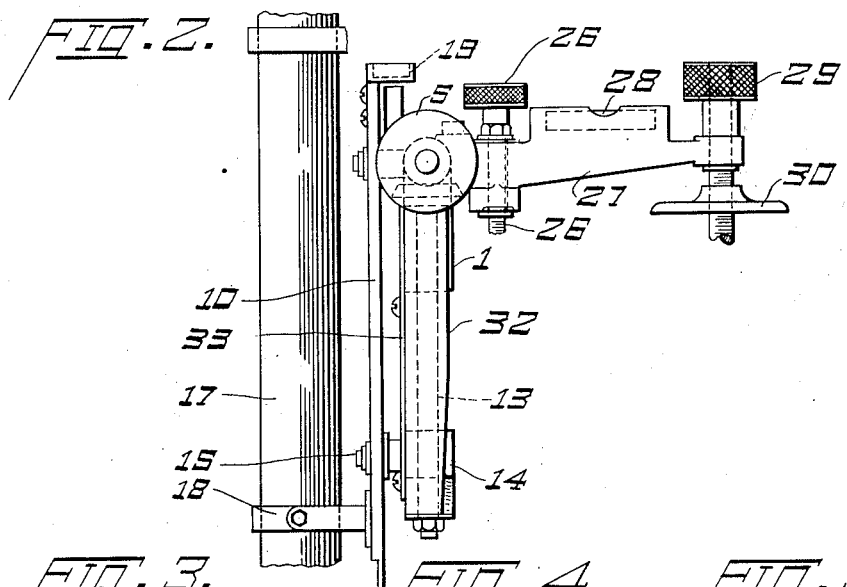
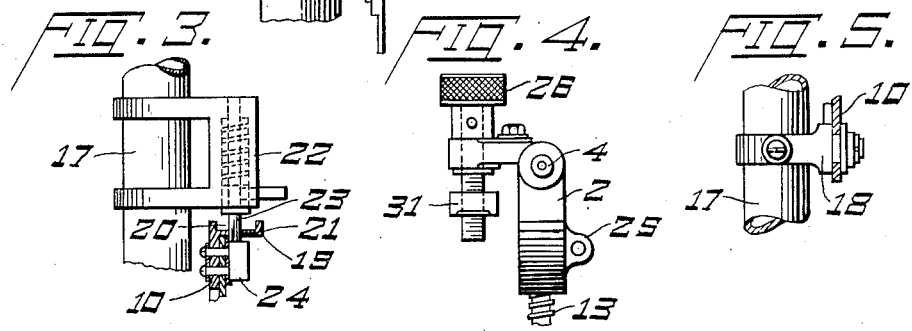
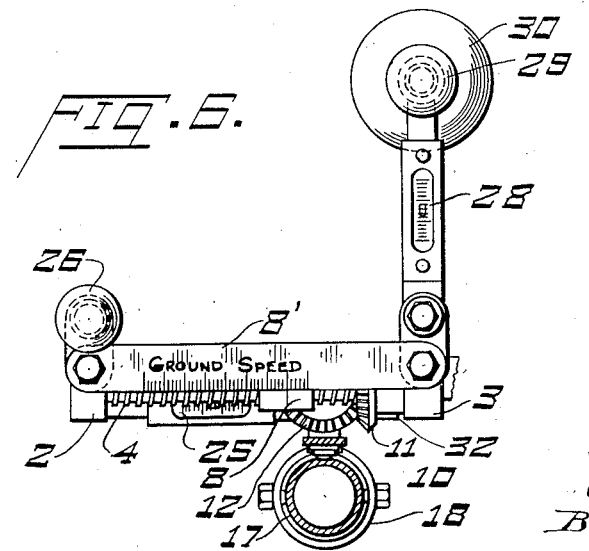

Patented Apr. 23, 1929.

1,710,115

UNITED STATES PATENT OFFICE.

HERBERT O. RUSSELL, OF DETROIT, MICHIGAN, AND CHARLES LEIGH PAULUS, OF DAYTON, OHIO.

AUTOMATIC BOMB SIGHT.

Application filed April 18, 1922. Serial No. 555,418.

This invention relates to bomb sights, especially for use in conjunction with an electrically controlled bomb rack.

The object of the invention is to provide simple and reliable means whereby the instrument when properly adjusted is caused to function automatically by simply following the target beneath with a sighting instrument such as a telescope. In case the aircraft carrying the instrument is flying on a true course which will carry it directly over the target, when a predetermined point is reached in the movement of the sighting instrument, the electric circuit will be closed and the bomb or bombs dropped, this being done automatically without any attention on the part of the bomber. In case the machine is not flying in a path which will carry it directly over the target, the circuit will not be closed and therefore the bomb or bombs will not be dropped.

With the above and other objects in view, the invention consists in the novel construction, combination and arrangement herein fully described, illustrated and claimed.

In the accompanying drawings:

Figure 2 is an end view thereof.

Figure 3 is a fragmentary section showing the electrical circuit means.

Figure 4 is a fragmentary elevation showing one of the level adjustment screws and a part of the frame.

Figure 5 is a fragmentary view of the universal supporting means for the telescope.

Figure 6 is a plan view of the bomb sight partially in section.

Figure 1:
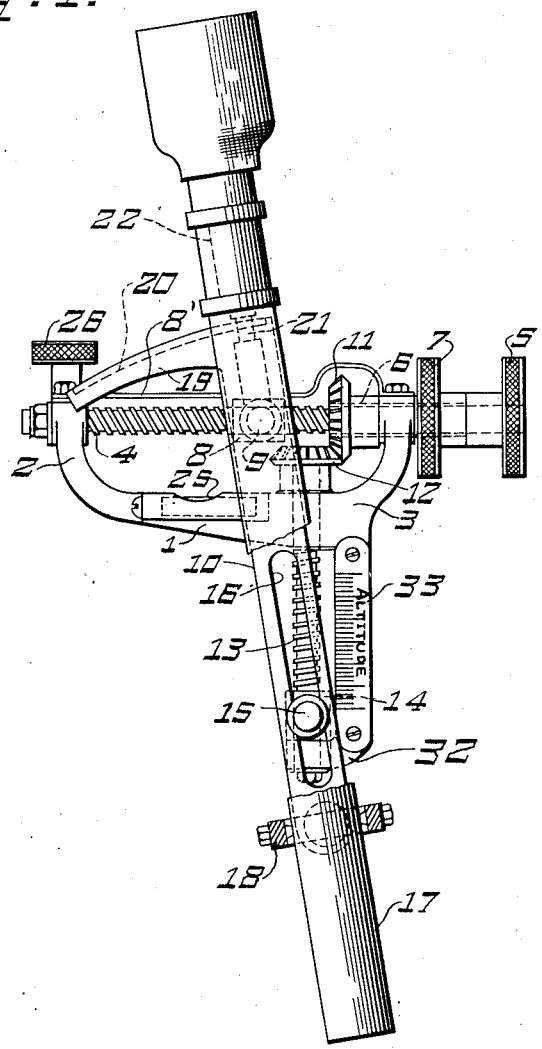
Figure 1 is a side elevation of the instrument.

In the construction of the automatic bomb sight, we employ a mounting frame or bracket 1 having end upright portions 2 and 3 in which is journaled a threaded shaft 4 operable by means of a knob 5 at one end thereof used to regulate the instrument in accordance with the ground speed of the aircraft as will hereinafter appear. Surrounding the shaft 4 freely is a rotatable sleeve 6 carrying an operating knob 7 which is manipulated to compensate for altitude, the altitude correction being compounded on the ground speed correction or vice versa.

The threaded shaft 4 engages or moves back and forth a fulcrum block 8 relative to a ground speed scale on the plate 8' extending lengthwise of the shaft 4. The block 8 has a journal 9 which works in a bearing of corresponding shape in a sighting instrument support 10. The sleeve 6 is connected by gears 11 and 12 to a threaded shaft 13 which is perpendicular to the shaft 4 and operatively connected to a vertically movable fulcrum block 14 carrying a pin or journal 15 which is movable along a slot or guideway 16 extending longitudinally of the support 10.

A sighting instrument 17 such as a telescope is supported by a universal bearing or fulcrum ring 18 which is connected to the support 10 in the manner illustrated in Figures 5 and 6. This permits the telescope to be moved forwardly and rearwardly and from one side to the other relative to the mounting frame. At its upper end the support 10 is formed with a rearwardly extending arm 19 having a wide channel 20 therein as shown in Figure 3 which is arranged parallel to or on the fore and aft axis of the ship. A hole 21 extends through the channeled arm 19 of the support 10 at one end of the channel 20 as shown in Figure 1. The upper part of the sighting member carries a housing 22 in which is a spring-pressed circuit closing contact pin 23 which moves along the channel 20 of the arm 19 as the sighting member 17 is turned in keeping the target in view after it is first picked up. When the pin 23 registers with the hole 21, it is pressed downwardly through said hole and into engagement with another contact member 24 mounted in insulated relation on the support 10. This closes the circuit which controls the dropping of the bombs in the bomb rack. It will be noted that the channel 20 is wider than the diameter of the pin 23. This is done in order to prevent the dropping of a bomb in case the aircraft is not moving along a path which will lead it directly over the target. In such case the pin 22 will pass to one side or the other of the hole 21. Only when the aircraft is moving along the proper course will the pin 23 drop through the hole 21 and close the bombing circuit. The base of the mounting bracket carries a spirit level 25 for denoting the levelness of the frame, which is adjusted by means of a screw 26. A lateral arm or extension 27 carries a spirit level 28 in right angle relation to the level 25, and a level-adjusting screw 29 which passes through a fitting 30 on the craft. The level-adjusting screw 26 passes through another fitting 31 on the aircraft.

The mounting bracket which is provided with a depending leg 32 which provides a lower bearing for the threaded shaft 13 and a stop for the fulcrum 14. Mounted on the leg 32 is an altitude scale shown at 33 with reference to which the block 14 is adjusted in accordance with variations of altitudes.

In the operation of the instrument, the support 10 is given proper angularity by adjusting the knobs 5 and 7 for the ground speed and altitude corrections respectively, the one correction being compounded on the other. The settings in both cases are determined by noting the position of the fulcrums with reference to the altitude and ground speed scales. The sighting instrument 17 is then swung to the extreme rearward position to secure the first glimpse of the target at some point on the ground ahead of the ship. As the ship approaches the target the instrument is constantly kept sighted on the target, the pilot meanwhile endeavoring to fly in as nearly a true course over the target as possible. At the proper interval for the release of the bomb denoted by the angularity of the support 10, the bombing circuit will be completed by the contact on the sighting instrument arriving at the end of the segment 19. If the course of the ship has been properly maintained in which event the vertical plane through the axis of the sighting instrument fixed on the target is in a line on or parallel to the fore and aft axis of the ship, the contact on the sighting instrument will drop through the opening in the support 10 and complete the bombing circuit. Otherwise the bombing circuit is not completed and the pilot will have to maneuver his ship about and repeat the operation. There is thus definite assurance when the bomb is released that it will reach the target.

The improved bomb sight hereinabove described and illustrated in the drawings removes the personal element from dropping bombs inasmuch as it is unnecessary to operate any lever or button when the ship is at the correct dropping position relative to the target. In case the target should be slightly to the side of the line of flight of the airplane, the circuit closing pin will pass one side of the hole in the channelled arm and will not drop through the hole and will therefore fail to close the circuit. The bombs will therefore not be dropped. The location of the hole in the support makes certain that if the target is kept upon the cross hairs of the telescope the bombs cannot be dropped unless the airplane is in the correct position for the bombs to strike the target. The altitude necessary for setting the bomb sight may be read from the altimeter and the ground speed may be read from an auxiliary ground speed indicator; or the ground speed may be determined by noting the time necessary for an object on the ground to pass between two auxiliary cross hairs within the telescope.

What we claim is:

1. An automatic bomb sight for aircraft, embodying a mounting frame, a sighting instrument support thereon, a sighting instrument movably supported thereby to be kept constantly on a target, means for varying the angle of said support relative to said frame to compensate for ground speed, an electrical contact member on said support, and another electrical contact member carried by the sighting instrument, and means to prevent said contact members from engaging except when the movement of said sighting instrument is on a line on or parallel to the fore and aft axis of the ship and hence when the course of the aircraft is not in a true line with the target, the last named means including a contact pin on the sighting instrument and a channeled portion of said support parallel to the fore and aft axis of the ship having an opening through which said pin can move in only one position of the sighting instrument, this position being to close the bomb circuit when the sighting instrument is on a line to the fore and aft axis of the ship thereby insuring that the bomb is dropped only when the aircraft is moving at the instant in a true direction to pass directly over the target.

2. An automatic bomb sight for aircraft, embodying a mounting frame, a sighting instrument support, a sighting instrument movably supported thereby, means including two shiftable fulcrums for varying the angle of said support relative to said mounting frame to compensate for ground speed and altitude respectively, an electrical contact member on said support, and another electrical contact member carried by the sighting instrument and adapted to engage said first contact when the sight is in a predetermined position relative to its support.

3. In an automatic bomb sight for aircraft, the combination of a support, a ground speed screw rotatably mounted therein, an altitude screw rotatably mounted in said frame in right angle relation to said ground speed screw, fulcrums connected to and movable along said screws in the adjustment thereof, a sighting instrument support pivotally mounted on one of said fulcrums, pivoted and slidable on the other fulcrum, a sighting instrument capable of a limited amount of free universal movement with reference to said support, a contact on said instrument movable therewith relative to said support, and a second contact on said support to be engaged by said first contact in only one position which the sighting instrument may occupy with respect to said support.

4. An automatic bomb sight for aircraft comprising the combination with a mounting frame of a sighting instrument support thereon, a universally pivoted sighting instrument mounted on said support, means for varying the angle of said support relative to said mounting frame to correct for ground speed, a second means for varying the angle of said support to correct for altitude and electric contact means carried by said sighting instrument and support respectively and adapted to contact when the sighting instrument is in a predetermined position relative to said support.

5. An automatic bomb sight for aircraft comprising the combination with a mounting frame of a sighting instrument support thereon, a universally pivoted sighting instrument mounted on said support, manually operable means for varying the angle of said support relative to said frame to correct for ground speed and altitude respectively and means operated by the movement of said sighting instrument relative to said support to actuate a controlling circuit when the sighting instrument is moved to a predetermined angle of inclination.

6. An automatic bomb sight for aircraft comprising the combination with a mounting frame of a sighting instrument support thereon, a universally pivoted sighting instrument mounted on said support, an electric contact element carried by said sighting instrument, a second electric contact element on said support and means intermediate said first and second element whereby the swinging of said sighting instrument in a predetermined plane actuates said element.

7. An automatic bomb sight for aircraft comprising the combination with a mounting frame of a sighting instrument support thereon, a universally pivoted sighting instrument supported thereby and to be kept sighted on a target, a ground speed scale on said support, means comprising a shiftable fulcrum movable relative to said ground speed scale to vary the angle of inclination of said support to correct for ground speed, and electric contact member carried by said sighting instrument and support respectively and adapted to contact one with the other when the sighting instrument is in a predetermined position relative to said support.

8. An automatic bomb sight comprising the combination with a mounting frame of a sighting instrument support thereon, a universally pivoted sighting instrument support thereby to be kept sighted on a target, a ground speed scale on said support, a vertically mounted altitude scale on said support, means comprising a vertically shiftable fulcrum movable in relation to said altitude scale to vary the angle of inclination of said support to correct for altitude, electric contact member carried by said instrument and a second electric contact member on said support, said contact being brought into contact with each other in only one position which the sighting instrument may occupy with respect to said support.

9. An automatic bomb sight for aircraft comprising the combination with a mounting frame of a sighting instrument support thereon, universally pivoted sighting instrument supported thereby to be kept sighted on a target, means for varying the angle of said support relative to said mounting frame to correct for ground speed, a vertically mounted altitude scale on said support, means comprising a vertically shiftable fulcrum movable in relation to said altitude scale to vary the angle of inclination of said support to correct for altitude, said last mentioned correction being compounded on the ground speed correction, an electric contact member on said support, a second contact member carried by said sighting instrument and a channel portion carried by said support and having an opening therein whereby to permit said last mentioned contact member to contact with said first mentioned contact member when said sighting instrument is in a determinate position relative to said support.

In testimony whereof we affix our signatures.

HERBERT O. RUSSELL.
CHARLES LEIGH PAULUS.